United States Patent
Ligman

[11] 4,009,419
[45] Feb. 22, 1977

[54] SAFETY CIRCUIT FOR VIDEO DIVER

[75] Inventor: James R. Ligman, Santa Barbara, Calif.

[73] Assignee: General Aquadyne, Inc., Santa Barbara, Calif.

[22] Filed: July 16, 1975

[21] Appl. No.: 596,403

[52] U.S. Cl. ............................ 361/91; 178/DIG. 1; 178/DIG. 11; 321/14; 354/64; 307/64

[51] Int. Cl.$^2$ ......................................... H02H 7/20

[58] Field of Search .......... 317/33 VR, 33 R, 27 R, 317/31, 335 C; 321/14, 11, 16, 18, 25; 323/4, 6, 89 P, 56, 57; 307/66, 64; 354/64; 61/69 R; 178/DIG. 1, DIG. 11, DIG. 38; 174/70 S

[56] References Cited
UNITED STATES PATENTS

| | | | |
|---|---|---|---|
| 3,365,657 | 1/1968 | Webb | 323/56 |
| 3,375,434 | 3/1968 | Shapiro | 323/4 |
| 3,701,937 | 10/1972 | Combs | 321/14 X |
| 3,736,491 | 5/1973 | Kuster | 321/14 |
| 3,746,878 | 7/1973 | Viger, Jr. | 307/66 |
| 3,766,403 | 10/1973 | Tsutsumi | 307/66 |
| 3,816,809 | 6/1974 | Kuster | 317/33 VR X |
| 3,863,125 | 1/1975 | Tollrian et al. | 321/14 X |
| 3,911,352 | 10/1975 | Slack | 321/14 |
| 3,916,282 | 10/1975 | Rothermel | 321/14 X |
| 3,925,772 | 12/1975 | Miller et al. | 307/66 X |

Primary Examiner—J D Miller
Assistant Examiner—Patrick R. Salce
Attorney, Agent, or Firm—Harry W. Brelsford

[57] ABSTRACT

An underwater diver is provided with a video camera, light, and communications supplied with electrical current from the surface by a shipboard electrical circuit. The diver is protected from accidental excessive voltages and current by magnetically isolating the diver's current from the shipboard current and by employing optical feedback to control the voltages for the diver. Additionally, a standby battery is employed to energize this equipment when the shipboard power fails. The entire shipboard power supply is contained in a waterproof box upon which is also mounted a video monitor and a video recorder, both secured in watertight fashion to the box.

6 Claims, 4 Drawing Figures

SAFETY CIRCUIT FOR VIDEO DIVER

This invention relates to underwater diving wherein the diver is equipped with a video camera, a light source, and wire communications. More particularly, it relates to circuits and structural components that electrically isolate the diver from any accidental surges of voltage or current to which the apparatus may be subjected and delivers safe, low-voltage current to the diver for operation of these components.

Current commercial diving employs closed-circuit television or video to monitor the work of the diver. The diver has a video camera and illumination light mounted on his body, preferably on his helmet. A ship or boat tenders him at the surface and the video image signals are conducted to the surface where they are displayed on a video monitor which resembles a television broadcast receiver. In this fashion an engineer at the surface can see the same subject matter viewed by the diver and, by means of the two-way communication, can instruct the diver how to proceed with his task.

Such video monitoring heretofore has been hazardous because of the use of high voltage currents at the diver. Recent developments in video camera design and the use of incandescent light bulbs has made possible the transmission of low-voltage direct currents to the diver which are safe even when shorted at the diver by saltwater. Heretofore, however, the diver has not been protected from accidental high voltages that occur due to shipboard accidents and power malfunctions. For example, if 220 v. AC current accidentally is injected into a power supply instead of 28 v. DC current, the diver might be immediately electrocuted by the passage of this current along the wires and cables intended for low-voltage direct current. Also, a malfunctioning of shipboard generators might inject a voltage two or three times that intended, and the direct current reaching the diver might then be at an unsafe voltage.

The present invention prevents such accidents from subjecting the diver to unsafe voltages and currents. In summary, I provide a shipboard equipment box that houses all electrical and electronic components and is hermetically sealed so that saltwater or salt air does not interfere with the functioning. Further, I provide a power supply that handles either AC or DC input from the ship and converts any voltage under 1000 v. to a safe and usable current. I isolate the the input voltages and currents to the box from the voltages and currents to the diver by magnetic and optical transducers so that there is no direct electrical connection from the shipboard input power to the diver. Additionally, I protect the diver by automatic shutoffs that detect any unsafe voltage or current flowing to the diver. Further, my apparatus accommodates automatically to any length of conductors from the shipboard box to the diver by means of a constant current source at the shipboard.

Various objects, advantages, and features of the invention will be apparent in the following descriptions and claims considered together with the drawings forming an integral part of this specification and in which:

Figure 1:
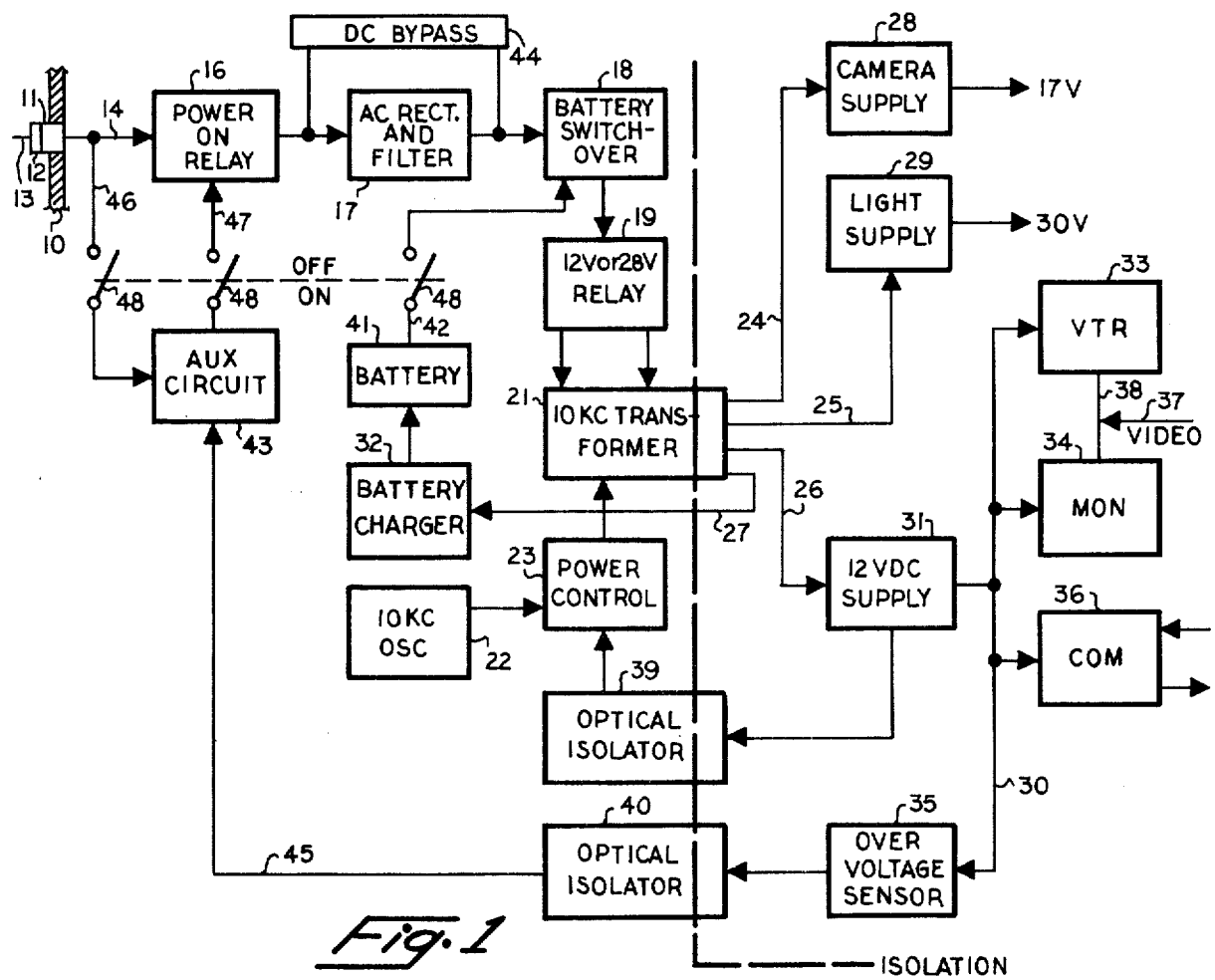
FIG. 1 is a schematic diagram of the shipboard power supply embodying the invention.

Referring to FIG. 1, there is illustrated the power supply which isolates the diver from, and direct connection to, the input of the power supply. In the upper left corner of FIG. 1, the waterproof box in which the equipment is disposed is indicated by wall 10 in which is fitted a multi-pin receptacle 11, which receives a multi-pin connector or plug 12 connected to a power cord 13. At present, four separate power cords 13 are used each having a plug 12 of identical construction. The commonly available shipboard power supplies are 220 v. AC, 110 v. AC, 28 v. DC, and 12 v. DC. The power cords connect to different pins in the connector 12, depending upon which of the four are utilized. In this fashion, there can be no mixup of the routing of the power inside of box 10.

The power passes from the receptacle 12 through a conductor 14 to a power-on relay 16, which when closed delivers the current to an AC rectifier and filter 17, which converts both 220 v. and 110 v. AC into 28 v. DC. The DC power from cord 13 bypasses this rectifier 17. The power next passes through a normally closed battery switch-over 18 to a transformer relay 19, which directs 12 v. direct current to all windings of a transformer 21 and directs 28 v. DC to only certain windings of the transformer 21. The windings of transformer 21 are alternately switched to ground by transistors at 10 KC rate, which causes a 10-KC flux alternation in the transformer core, which is preferably a toroid. The DC bypass is 44.

An oscillator 22 functions at 10 KC to alternately turn on the transistors of transformer 21, and the duration of time that each transistor is conducting is controlled by a power controller 23. In this fashion the amount of power in the primary windings of transformer 21 is precisely controlled, thereby precisely controlling the power in the secondary windings.

The transformer 21 has four independent secondary windings, each represented by the conductors 24, 25, 26, and 27 leading to a camera power supply 28, a light power supply 29, a 12-volt DC power supply 31, and a battery charger 32, respectively. The principal power user is the power supply 31, which is connected to and energizes a video tape recorder 33, a video monitor 34, and a communicator 36. A video signal from the diver is represented by a coaxial cable 37 connected to conductor 38 connected to the recorder 33 and the monitor 34. The recorder 33 is presently a tape recorder, and the monitor 34 displays the video or television image. Both are mounted on the box 10 in a watertight manner. The communicator 36 includes a loudspeaker and microphone mounted on the box or by plug-in. The diver similarly has earphones or equivalent and a microphone for two-way communication.

Referring still to FIG. 1, there is no direct connection from the power input cord 13 to the power supplies 28, 29, and 31, which deliver current to the diver. These power supplies are isolated by the magnetic transducer 21. In order to control the amount of power delivered by this transformer 21, a feedback circuit is necessary to the power controller 23. This feedback is also isolated, but instead of a magnetic transducer, I prefer at present to use an optical transducer or isolator 39. This I do by the use of light-emitting diodes and light-responsive transistors, so that only light, and not electrical current, connects the power supplies to the power control. While this control could be from any of the power supplies 28, 29, or 31, I prefer to use the 12-volt supply 31. As the output voltage of supply 31 varies even slightly from 12 volts, this optical feedback will send a signal to the power control 23 to give more or less power to thereby increase or decrease the voltage as required at power supply 31.

One of the safety features of this circuit is an internal standby battery power source. If the shipboard power should fail, the diver would be left in darkness and unable to communicate, which sometimes develops into a panic situation. Within the waterproof box 10 I dispose a rechargeable battery 41 connected to the charger 32 so that it is maintained at full power by a trickle charge. The battery 41 is connected to switch 18 by a conductor 42. The failure of shipboard power is sensed by the switch 18, which thereupon closes to connect the battery 41 to the transformer relay 19. At present I prefer to use a 24-volt battery.

Referring to the upper left part of FIG. 1, the power-on relay 16 is energized by an auxiliary circuit 43, which is energized by the shipboard power input conductor 14 by branch conductor 46. Leading from auxiliary circuit 43 to relay 16 is a control conductor 47. A manual off-on multi-pole switch 48 turns the entire system off or on. The auxiliary circuit utilizes any power to close the relay 16 and allows a low-current switch 48 to control the entire system.

I also provide an input power shutoff for over-voltages in the secondary, as an additional safety. Connected to power supply 31 is a wire 30 connected to an over-voltage sensor 35, which delivers a current to another optical isolator 40, which delivers a signal over wire 45 to the auxiliary circuit 43, which when so actuated opens the power-on relay 16 to cut off all shipboard power.

It will be noted that while there are direct connections from the power input cord 13 through the battery 41 and battery charger 32 to the secondary of the transformer 21, this does not interfere with the electrical isolation of the diver because the battery charger secondary is independent, isolated, and insulated from the other secondaries.

The circuit of FIG. 1 is tested for current leakage to the diver by impressing 1,000 volts AC and DC on each of the input terminals in receptacle 11 to each of the output terminals, to each of the input terminals to chassis, and to each of the output terminals to chassis. No currents greater than 5 microamperes are observed. The diver is thus fully protected from shipboard accidents that might introduce extraordinary voltages or currents to the systems.

Figure 2:
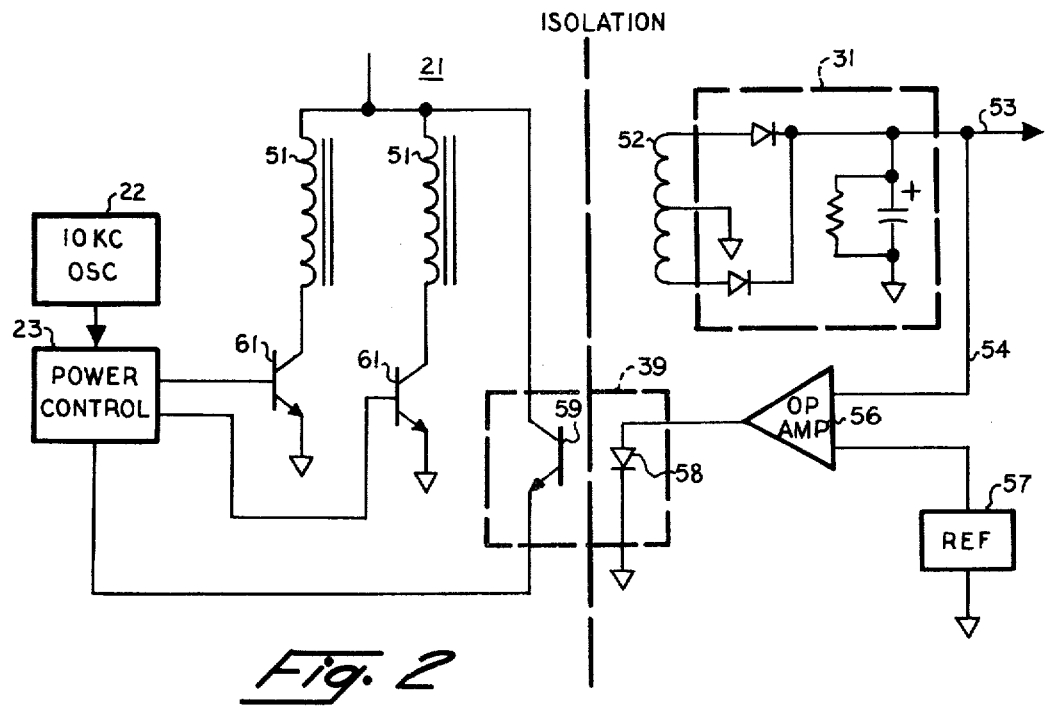
FIG. 2 is a more detailed schematic diagram of transformer, one power supply, and feedback circuit of FIG. 1.

Referring to FIG. 2, there is shown in more detail the transformer 21, power supply 31, and optical isolator 39. The transformer 21 is well known in the art and is shown here only for purposes of illustrating the optical feedback. The transformer has primary windings 51 and a secondary winding 52, and the second output is rectified and filtered in the usual manner and delivered to conductor 53. Branching from conductor 53 is a wire 54 leading to an operational amplifier 56, which compares this voltage to a reference voltage from an avalanche device 57, or equivalent, which produces a very accurate reference voltage, for example, 5.5 v. When the amplifier 56 detects a variation from a multiple of the reference 57, it delivers a control current to a light-emitting diode 58 in the optical isolator, which delivers more or less light according to the imbalance. This light is picked up by a light-responsive transistor 59, which generates a control voltage conducted by wire 61 to the power control 23. This control modifies the output of the oscillator 22 to control the length of each oscillation, which is impressed on transistors 61, which alternately connect the primaries 51 to ground. In this fashion, the optical feedback is accomplished, and there is no direct electrical connection for this feedback, only optical. The primary windings 51 can be considered as a single winding producing an alternating flux in a core, which is preferably a toroid. The presently preferred 10 KC rate seems to be best for size, efficiency, control, and presently available transistor capability.

Figure 3:
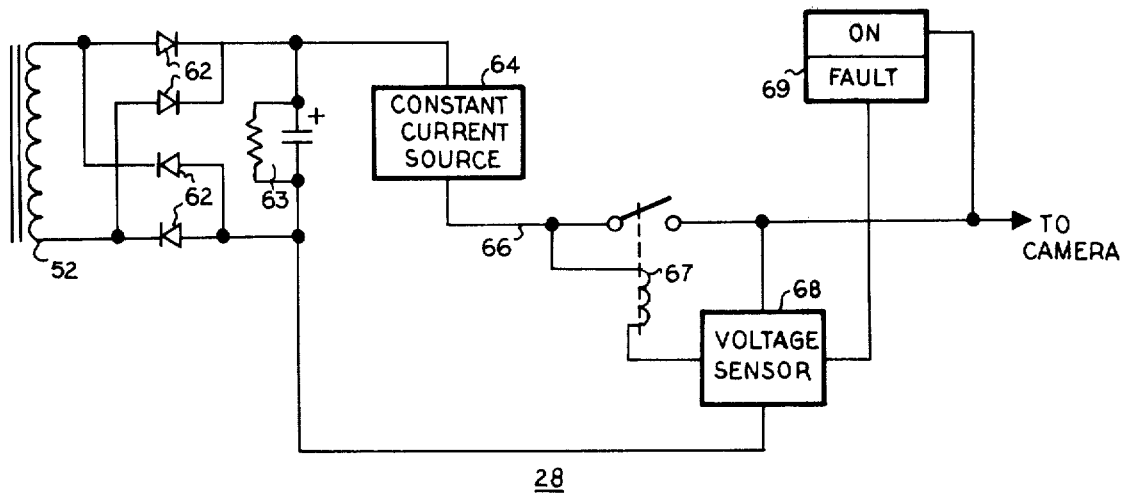
FIG. 3 is a schematic diagram of another of the power supplies of FIG. 1 wherein a constant current source supplies current to a diver regardless of the length of the conductor from the shipboard to the diver's level.

Referring to FIG. 3, there is illustrated one of the power supplies 28 or 29 of FIG. 1 and for convenience the camera power supply 28 is illustrated. One of the electrical variables in diving is the length of the wires leading to the diver. If the diver works in 30 feet of water, the wires may be 50 feet in length. If he works in 120 feet of water, the wires may be 150 feet in length. The resistance will vary with length, and the impedance of the coaxial cable will vary with length. Further, the insulation immediately starts to deteriorate in saltwater, and the resistance and impedance will vary with age of the wires. For this reason, a circuit is necessary that gives the required current and voltage at the diver regardless of these variables.

I have devised a constant current power supply for this purpose, as shown in FIG. 3. A secondary winding 52 generates a current which is full-wave rectified at 62 and filtered at 63 and delivered to a DC constant current circuit 64. The circuit 64 is well known in the art and delivers a constant current to the diver by increasing its voltage, the maximum of which must be lower than the rectified and filtered DC from the secondary 52. The output of 64 passes through wire 66 to a relay winding 67 and then to a voltage sensor 68. If the voltages of the constant current source 64 are within a preselected range, the switch of relay 67 will close and current will be delivered to the camera. For a presently preferred camera, this may be 17 v. DC at 200 ma, and for a presently preferred light, 30 v. DC at 300 ma.

If, however, there is some malfunction at the diver's equipment or an insulation breakdown in the wire, the voltage to drive the constant current will become excessive, and this will be sensed by circuit 68, which then cuts off flow through the relay coil 67 and the circuit opens. This also sends current to the "fault" light 69, an indicator on the console of the waterproof box 10 and informs the top side operator of the problem and he will then communicate with the diver. Voltage sensor 68 can be then recycled (by a circuit not shown), and if the diver has corrected the difficulty the current flow will be restored. If not, the current flow will be stopped again.

Similar voltage sensors and fault indicators are provided for the power supply 31 for the video recorder 33, monitor 34, and the communicator 36. In this circuit, however, an excessive current will be indicated by a voltage increase at the shipboard box.

The necessity for placing the circuit and other components in a waterproof box limits the cooling, because outside air cannot be circulated. Sealed in a part of the wall of box 10 are metal heat conductors having external fins to assist in heat dissipation. The rectifiers of 17 and the power transistors are mechanically connected.

The primary windings are insulated by the insulation of the wire of the primaries, and in addition an independent layer of insulation is added, such as glass, cloth, or fibers, and the entire transformer is potted with a material of high insulation value. In this fashion any specified amount of isolation of secondary from primary may be achieved.

FIG. 4

Figure 4:
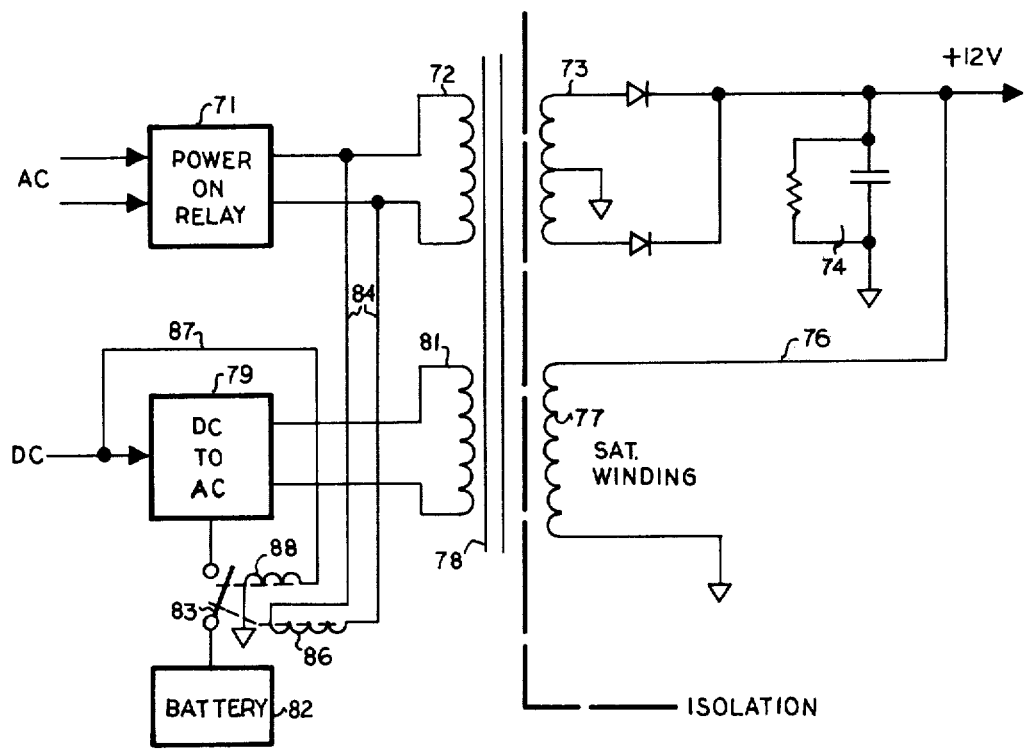
FIG. 4 is a schematic diagram of a modified power circuit that uses alternating current directly in the transformer.

Illustrated in FIG. 4 is a modified form of circuit wherein AC is directly utilized in the transformer and the feedback is magnetic. A power-on relay 71 operated like that of FIG. 1 transmits shipboard AC to a primary winding 72 of a transformer, which has a secondary winding 73 to energize a 12-volt power supply 74, which in turn has a branch wire 76 leading to a saturating winding 77 for a core 78 of the transformer. If the voltage at 74 rises, more current will flow in winding 77, giving more saturation and less power transmission to the secondary 73. In this manner magnetic feedback is accomplished with complete isolation of the secondary from the primary. If desired, the coil 77 could be connected to the secondary and in this fashion act as a bucking coil to reduce the power transmitted.

The circuit of FIG. 4 also has a connection for shipboard DC which is delivered to an AC converter 79, which delivers AC to a second primary winding 81. A standby battery 82 is automatically connected by a normally open relay 83 to the AC converter 79 when there is a failure of the AC or DC shipboard power. The AC input is connected by wires 84 to an AC winding 86 of the relay 83, and a wire 87 connects to a DC relay winding 88. When there is no current flowing through the relay windings 86 and 88, which occurs upon input failure, the relay 83 will close and the battery 82 will supply current to the primary 81. The relay 83 is thus a voltage sensor for the inputs.

I have described my invention as being used on shipboard, but it will be appreciated that it can be used on piers, oil-drilling platforms, islands, or any location where diving takes place.

I have described my invention in terms of my presently preferred embodiment, as required by the Rules. Various modifications will occur to those skilled in the art, and the specification is merely illustrative and not limiting. For this reason, there is included within the following claims all variations and modifications that come within the true spirit and scope of the invention.

I claim:

1. A video circuit for divers that protects the diver from shipboard electrical malfunctions comprising:
    a. a video camera carried by the diver;
    b. a shipboard video monitor electrically connected to the video camera for displaying video signals;
    c. a shipboard source of electrical current;
    d. a shipboard power supply transformer having a primary connected to said source and having a secondary connected to said video camera and said video monitor to supply power thereto;
    e. means for varying the amount of current flow to the transformer primary;
    f. and an optical feedback connection from the transformer secondary to the means for varying the current flow to the primary to thereby regulate the secondary output;

whereby the diver's video camera is electrically isolated from the shipboard source of electrical current, thereby protecting the diver from accidental high voltages or currents at the source of electrical current.

2. A video circuit as set forth in claim 1 wherein a constant current source is connected to, and interposed between, the transformer secondary and the video camera; a voltage sensor is connected to the constant current source to continuously sense the amount of voltage required to deliver the constant current; and a switch is connected in series between the constant current source and said video components, and actuated by the voltage sensor when the voltage of the constant current source drops below a predetermined value, to thereby interrupt the current to the video camera and provide a second line of electrical protection for the diver.

3. A video circuit as set forth in claim 2 wherein a fault indicator is connected to the voltage sensor and located at shipboard to inform the shipboard operator of the fault when the voltage becomes reduced, so that he can correct the fault under his control or communicate with the diver for the diver to correct the fault if it is under the diver's control.

4. A video circuit as set forth in claim 1 wherein an over-voltage sensor is connected to the transformer secondary; a power relay is connected between the shipboard source of power and the transformer primary; and an optical isolator is connected between the over-voltage sensor and the relay to actuate the power relay to cut off shipboard power when the secondary voltage becomes excessive.

5. A shipboard power supply for a diver having equipment that requires electrical current, comprising:
    a. a shipboard waterproof box having walls;
    b. means in a box wall for connecting to a source of shipboard electrical current;
    c. a transformer in the box having a primary winding connected to the box source means and having a secondary winding;
    d. means in the box for varying the amount of current flow in the primary winding;
    e. a video camera carried by the diver;
    f. a video monitor secured to the box with a watertight joint;
    g. a power connection passing through the box wall from the secondary winding to the video camera;
    h. a signal connection from the video camera to the video monitor;
    i. a power connection from the secondary winding to the video monitor; and
    j. an optical feedback in the box connecting the transformer secondary with the means for varying the amount of current flow in the primary winding;

whereby said power supply is protected from water and salt air, and the conductors from the shipboard to the diver are isolated from shipboard electrical currents and voltages to give the diver protection from shipboard electrical accidents.

6. A power supply as set forth in claim 5 wherein there is connected to the transformer primary means for creating an alternating current in the primary winding, and a battery is connected to said means to power the equipment when the shipboard power becomes excessive.

* * * * *